(12) United States Patent
Chakrabarti

(10) Patent No.: US 8,512,853 B2
(45) Date of Patent: Aug. 20, 2013

(54) COMPOSITE STRUCTURE HAVING REINFORCED CORE

(75) Inventor: Buddhadev Chakrabarti, Walnut, CA (US)

(73) Assignee: The Boeing Company, Chicago, IL (US)

(*) Notice: Subject to any disclaimer, the term of this patent is extended or adjusted under 35 U.S.C. 154(b) by 1621 days.

(21) Appl. No.: 11/831,066

(22) Filed: Jul. 31, 2007

(65) Prior Publication Data

US 2009/0035510 A1    Feb. 5, 2009

(51) Int. Cl.
*B32B 7/08*      (2006.01)

(52) U.S. Cl.
USPC .......................................... 428/223; 52/790.1

(58) Field of Classification Search
USPC ............. 52/309.1, 309.2, 309.14, 790.1, 630; 244/119, 120, 123.4, 123.5, 123.6, 131; 428/223
See application file for complete search history.

(56) References Cited

U.S. PATENT DOCUMENTS

| | | | |
|---|---|---|---|
| 3,579,411 A | 5/1971 | Mackie et al. | |
| 4,103,470 A | 8/1978 | Cook | |
| 4,151,031 A | 4/1979 | Goad et al. | |
| 4,361,613 A | 11/1982 | Bogner et al. | |
| 4,556,591 A | 12/1985 | Bannink, Jr. | |
| 4,556,592 A | 12/1985 | Bannink, Jr. | |
| 4,614,013 A | 9/1986 | Stevenson | |
| 4,664,731 A | 5/1987 | Layden et al. | |
| 4,709,714 A | 12/1987 | Nishino et al. | |
| 4,786,343 A | 11/1988 | Hertzberg | |
| 4,808,461 A | 2/1989 | Boyce et al. | |
| 4,822,660 A | 4/1989 | Lipp | |
| 5,102,723 A * | 4/1992 | Pepin ............................ | 428/223 |
| 5,177,039 A | 1/1993 | Allaire et al. | |
| 5,225,015 A | 7/1993 | Allaire et al. | |
| 5,506,018 A | 4/1996 | Jacob et al. | |
| 5,589,015 A | 12/1996 | Fusco et al. | |
| 5,632,834 A | 5/1997 | Ostertag et al. | |
| 5,650,229 A | 7/1997 | Gross et al. | |
| 5,667,859 A | 9/1997 | Boyce et al. | |
| 5,789,061 A | 8/1998 | Campbell et al. | |
| 5,827,383 A | 10/1998 | Campbell et al. | |
| 5,869,165 A | 2/1999 | Rorabaugh et al. | |
| 5,876,652 A * | 3/1999 | Rorabaugh et al. ........... | 264/258 |
| 5,958,550 A | 9/1999 | Childress | |
| 6,291,049 B1 | 9/2001 | Kunkel et al. | |

(Continued)

FOREIGN PATENT DOCUMENTS

DE    10 2006 056568    6/2008
EP    08161510.6-2124    11/2008

(Continued)

OTHER PUBLICATIONS

EP 08161510.6-2124 European Search Report.

(Continued)

*Primary Examiner* — Brian Glessner
*Assistant Examiner* — James Buckle, Jr.
(74) *Attorney, Agent, or Firm* — Yee & Associates, P.C.

(57) ABSTRACT

A polymer-based composite sandwich includes a core bonded between fiber reinforced resin facesheets. The core includes a truss formed by groups of composite pins held in a low density foam. The pins in each group intersect to form nodes adjacent to one of the facesheets. The ends of the pins extend parallel and are bonded to the facesheets.

29 Claims, 12 Drawing Sheets

(56) References Cited

U.S. PATENT DOCUMENTS

| | | |
|---|---|---|
| 6,511,727 B1 | 1/2003 | Bleibler et al. |
| 6,645,333 B2 | 11/2003 | Johnson et al. |
| 6,676,785 B2 | 1/2004 | Johnson et al. |
| 6,716,782 B2 | 4/2004 | Heng et al. |
| 6,740,381 B2 | 5/2004 | Day et al. |
| 6,746,755 B2 | 6/2004 | Morrison et al. |
| 6,830,286 B2 | 12/2004 | Bechtold et al. |
| 6,969,546 B2 | 11/2005 | DiChiara, Jr. |
| 7,056,576 B2 | 6/2006 | Johnson |
| 7,105,071 B2 | 9/2006 | Johnson et al. |
| 7,200,912 B2 | 4/2007 | Bouillon et al. |
| 7,217,453 B2 | 5/2007 | Johnson et al. |
| 7,312,274 B2 | 12/2007 | Millard et al. |
| 7,424,967 B2 | 9/2008 | Ervin et al. |
| 7,731,046 B2 | 6/2010 | Johnson |
| 7,758,715 B2 | 7/2010 | Petersson et al. |
| 7,785,693 B2 | 8/2010 | Johnson et al. |
| 7,846,528 B2 | 12/2010 | Johnson et al. |
| 7,891,096 B2 | 2/2011 | Weber et al. |
| 7,972,430 B2 | 7/2011 | Millard et al. |
| 8,034,428 B2 | 10/2011 | Verhaeghe |
| 8,038,894 B2 | 10/2011 | Brooks |
| 8,097,106 B2 | 1/2012 | Hand et al. |
| 8,127,450 B2 | 3/2012 | Weber et al. |
| 2001/0031350 A1* | 10/2001 | Day et al. .................. 428/317.9 |
| 2002/0007607 A1* | 1/2002 | Matlack et al. .............. 52/403.1 |
| 2002/0053176 A1* | 5/2002 | Colson et al. .............. 52/506.06 |
| 2002/0144767 A1 | 10/2002 | Johnson et al. |
| 2003/0059577 A1 | 3/2003 | Morrison et al. |
| 2005/0025948 A1 | 2/2005 | Johnson et al. |
| 2005/0112321 A1 | 5/2005 | Millard et al. |
| 2006/0163319 A1 | 7/2006 | Ervin et al. |
| 2007/0193146 A1* | 8/2007 | Carstensen et al. ............. 52/268 |
| 2009/0005232 A1 | 1/2009 | Hand et al. |
| 2009/0019685 A1 | 1/2009 | Keith et al. |
| 2009/0320292 A1 | 12/2009 | Brennan et al. |
| 2010/0102172 A1 | 4/2010 | Bardwell |
| 2010/0151189 A1 | 6/2010 | Chakrabarti |
| 2011/0097554 A1 | 4/2011 | Kehrl et al. |

FOREIGN PATENT DOCUMENTS

| | | |
|---|---|---|
| EP | 2017073 A2 | 1/2009 |
| EP | 2025504 A1 | 2/2009 |
| JP | 2009023348 A | 2/2009 |

OTHER PUBLICATIONS

European Search Report, dated Dec. 5, 2011, regarding Application No. EP08252351 (EP2017073), 8 pages.

USPTO Office Action dated Nov. 29, 2011, regarding U.S. Appl. No. 12/705,675, 11 pages.

Response to Office Action, dated Feb. 29, 2012, regarding U.S. Appl. No. 12/705,675, 12 pages.

USPTO Final Office Action dated Apr. 2, 2012, regarding U.S. Appl. No. 12/705,675, 10 pages.

USPTO Office Action, dated Jul. 20, 2011, regarding U.S. Appl. No. 11/779,439, 11 pages.

USPTO Office Action, dated Apr. 4, 2012, regarding U.S. Appl. No. 11/779,439, 8 pages.

Response to Final Office Action, dated Jun. 26, 2012, regarding U.S. Appl. No. 12/705,675, 15 pages.

Office Action, dated Sep. 5, 2012, regarding U.S. Appl. No. 12/705,675, 12 pages.

Final Office Action, dated Sep. 5, 2012, regarding U.S. Appl. No. 11/779,439, 13 pages.

* cited by examiner

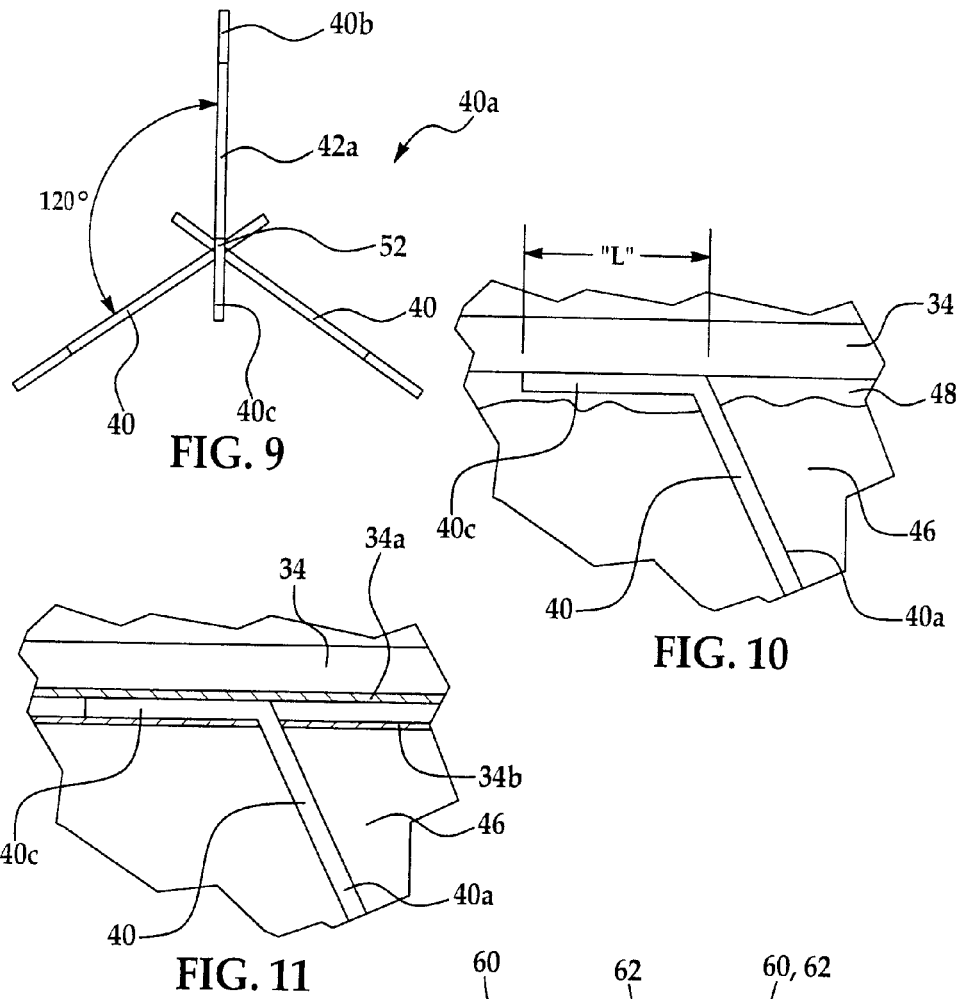
FIG. 9
FIG. 10
FIG. 11
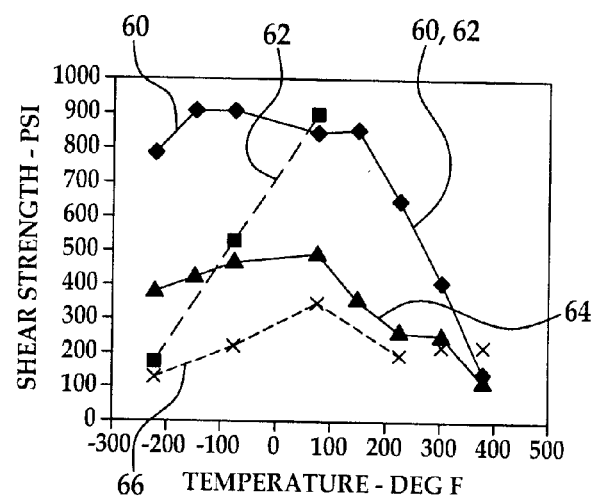
FIG. 12

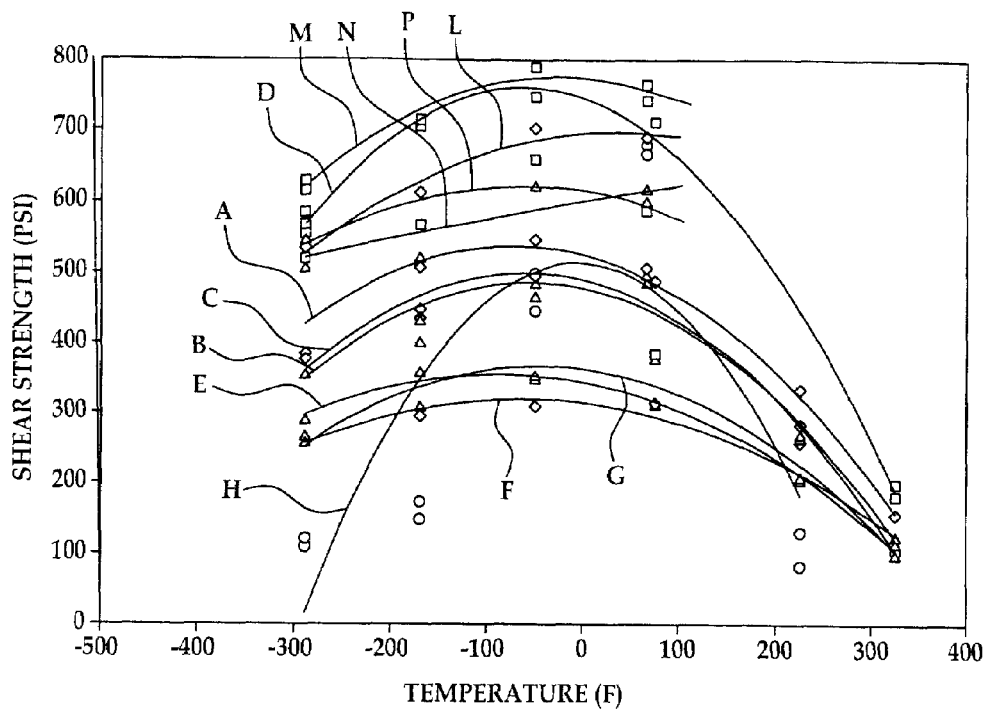

FIG. 13

A. 12.08 pcf, 0.50" 51WF, 0.020" dia, 35deg angle, 8.88 density, 0.080 rev high
B. 9.02 pcf, 0.50" 51WF, 0.020" dia, 35deg angle, 5.82 density, 0.080 rev high
C. 11.94 pcf, 0.50" 51IG, 0.020" dia, 20deg angle, 8.74 density, 0.080 rev high
D. 12.00 pcf, 0.50" 51IG, 0.028" dia, 35deg angle, 8.80 density, 0.080 rev high
E. 12.08 pcf, 0.50" 31IG, 0.020" dia, 35deg angle, 5.30 density, 0.080 rev high
F. 6.89 pcf, 0.50" 31IG, 0.020" dia, 35deg angle, 4.89 density, 0.080 rev high
G. 6.90 pcf, 0.50" 51IG, 0.020" dia, 35deg angle, 3.7 density, 0.080 rev high
H. 0.50" 200WF
J. 0.50" 110WF
L. 12.01 pcf, 0.50" 51IG, 0.020" dia, 30deg angle, 8.81 density, 0.055 rev high
M. 12.01 pcf, 0.50" 51WF, 0.020" dia, 30deg angle, 8.81 density, 0.055 rev high
N. 12.01 pcf, 0.50" 51WF, 0.020" dia, 30deg angle, 8.81 density, 0.080 rev high
P. 11.34 pcf, 0.50" 51WF, 0.020" dia, 30deg angle, 8.14 density, 0.055 rev high

FIG. 14

| CORE DENSITY LBS/CFT (68) | THICKNESS (INCHES) (70) | PIN DIAMETER (INCHES) +/- 0.0015" (72) | PIN ANGLE (FROM VERTICAL) (74) | PIN SPACING (SQUARE PITCH) (76) | REVEAL HEIGHT (INCHES) (78) | PINS PER NODE (80) | BASE FOAM ROHACELL (82) |
|---|---|---|---|---|---|---|---|
| 6.9 | ½ | 0.02 | 30° | 0.191" | 0.055 | 4 | 51WF |
| 6.9 | ¾ | 0.02 | 30° | 0.187" | 0.055 | 4 | 51WF |
| 6.9 | 1 | 0.02 | 30° | 0.185 | 0.055 | 4 | 51WF |
| 12 | ½ | 0.028 | 30° | 0.173 | 0.055 | 4 | 51WF |
| 12 | ¾ | 0.028 | 30° | 0.170 | 0.055 | 4 | 51WF |
| 12 | 1 | 0.028 | 30° | 0.168 | 0.055 | 4 | 51WF |

COMPOSITE STRUCTURE HAVING REINFORCED CORE

TECHNICAL FIELD

This disclosure generally relates to composite structures, and deals more particularly with a composite sandwich having a reinforced core, and a method of making the composite sandwich.

BACKGROUND

Composite sandwich constructions may be strengthened by placing structural reinforcement inside a core that is bonded between two facesheets. The core reinforcement may include structural elements that define load paths for transferring compressive, tensile and shear loads between the facesheets. The performance of the composite sandwich is dependent in part upon the type of core reinforcement and the quality of the bonds between the core and the facesheets. Common materials used in the core may include rigid plastic foam and honeycomb. While honeycomb cores exhibit good structural efficiency, they may subjected to higher core-to-facesheet loading in some applications, such as long duration space flights where a differential pressure may develop between the core and the surrounding environment.

Unreinforced closed cell rigid foam cores may exhibit reduced structural efficiency when subjected to moisture and to higher temperatures, or extreme low temperatures in space.

The problems associated with the sandwich constructions discussed above have been partially solved by the introduction of so-called X-COR structural cores which comprise a light-weight, closed cell polymethacrylimide (PMI) foam reinforced with small diameter, poltruded carbon fiber/epoxy pins arranged in a tetragonal truss network. The X-COR pins extend beyond the foam core and are embedded in the facesheets. A variation of X-COR is disclosed in U.S. Pat. No. 6,291,049 issued Sep. 18, 2001, in which the ends of the pins are bent so as to lie flat against facesheets to which the core is bonded.

The truss networks mentioned above that employ carbon fiber/epoxy pins may not provide adequate performance in some aerospace applications. Accordingly, there is a need for a composite structure having a reinforced core that is suitable for demanding aerospace applications in which superior bond strength between the facesheets and core is required. Embodiments of the disclosure are intended to satisfy this need.

SUMMARY

Embodiments of the disclosure provide a composite sandwich construction in which improved facesheet-to-core bond strength is achieved while assuring that the structural integrity of the core is maintained. The construction and material selection used in the sandwich construction renders it suitable for aerospace applications, including long duration space missions in which differential pressures may arise between the core and the surrounding environment. The improved bond strength provided by the disclosed embodiments may be maintained over a wide range of temperature and moisture conditions.

According to one embodiment, a composite sandwich comprises: first and second fiber reinforced polymer facesheets; and, a reinforced core between the first and second facesheets. The core includes a plurality of pins arranged in groups forming a truss, and a carrier surrounding the pins. Each of the pins includes medial portions extending between the facesheets, and distal portions respectively extending generally parallel with and bonded to the facesheets. The pins in each group intersect at a node adjacent one of the facesheets. The pins and the facesheets may comprise carbon fiber reinforced resin, such as epoxy so that the coefficient of thermal expansion of the core truss is substantially equal to that of the facesheets. The distal portions of the pins in each group radiate outwardly from the node, and the nodes may be spaced substantially equidistant from each other. The pin groups include at least three pins which are inclined relative to the planes of the facesheets. The carrier may include a rigid, low density, closed cell foam such as polymethacrylimide, having a coefficient of thermal expansion generally matching that of the facesheets. The reinforced core comprising the carrier foam and a graphite/epoxy poltruded rod lattice structure, may have a density of between approximately 6.9 and 12 pounds per cubic foot, and the core may have a thickness of between one half and one inch, where the nodes are spaced from each other between 0.168 and 0.191 inches.

According to another embodiment, a reinforced polymer composite structure comprises: a pair of fiber reinforced polymer facesheets, and a reinforced core between the facesheets. The reinforced core may include a plurality of structural pins arranged in groups thereof, wherein the pins in each of the groups make intersecting contact with each other and are spaced around a central axis extending generally normal to the facesheets. The pins in each of the groups may be symmetrically arranged around the central axis and include distal portions extending substantially parallel with and bonded to the facesheets.

According to a method embodiment, a reinforced composite sandwich may fabricated by the steps comprising: fabricating a core by forming a layer of foam and forming groups of intersecting structural pins in the foam layer; bending the ends of the pins; and, bonding the bent ends of the pins to a pair of fiber reinforced facesheets. The groups of pins may be formed by inserting the pins into the foam layer along nearly intersecting trajectories. The method may further include the steps of: poltruding a length of graphite epoxy composite material; partially curing the length of graphite epoxy material; and, forming the pins by cutting the length of the graphite epoxy material.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 9 is an illustration similar to FIG. 6 but showing an alternate form of a pin group employing three pins.

FIG. 10 is a sectional illustration showing the distal end of a pin bonded to a facesheet in the sandwich construction shown in FIG. 1.

FIG. 11 is an illustration similar to FIG. 10 but showing the distal end of a pin bonded between adjacent plies of the facesheet.

FIG. 12 is a graph illustrating the improvement in shear strength of a sandwich construction employing the reinforced core, compared with an unreinforced foam core.

FIG. 13 is a graph showing the results of three point bending tests used to determine the shear strength of sandwich constructions, including the disclosed embodiments.

FIG. 14 is a key for use in interpreting the graph shown in FIG. 13.

DETAILED DESCRIPTION

Figure 1:
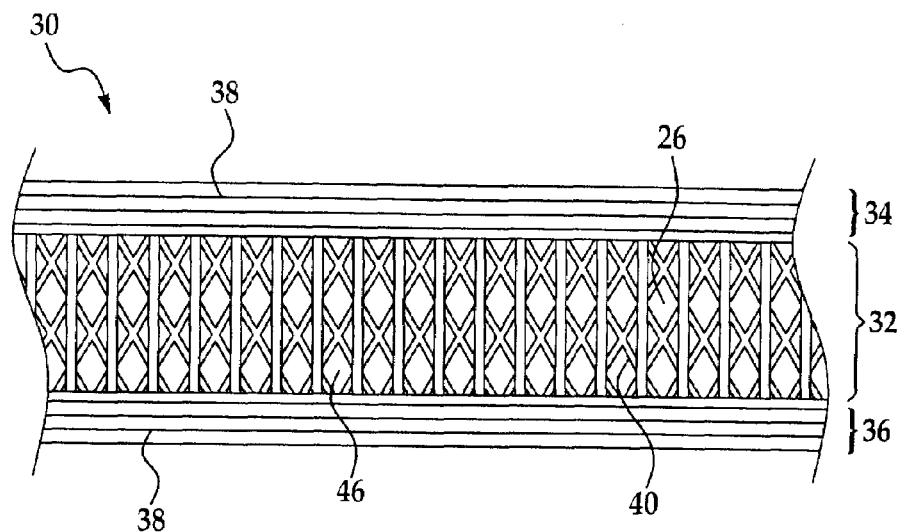
FIG. 1 is a cross sectional illustration of a composite sandwich having a reinforced core according to an embodiment.
Figure 2:
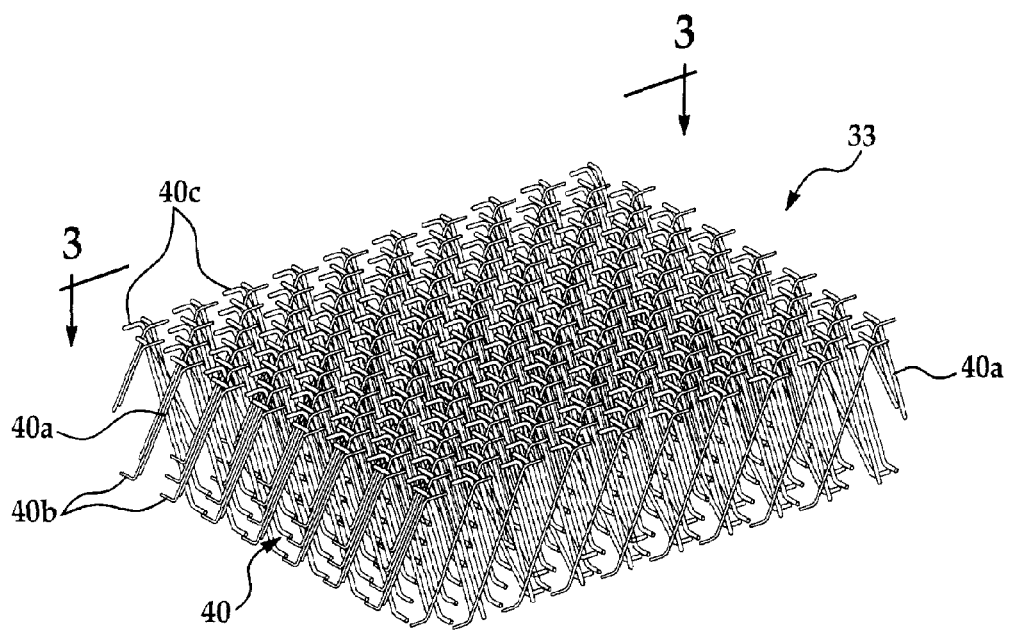
FIG. 2 is an isometric illustration of the reinforcing truss forming part of the core shown in FIG. 1.

Referring first to FIGS. 1-9, a composite sandwich construction generally indicated by the numeral 30 broadly comprises a reinforced core 32 sandwiched between and bonded to a pair of outer facesheets 34, 36. Each of the facesheets 34, 36 may comprise multiple plies 38 of fiber reinforced polymer resin, such as graphite fibers in cloth or other form, held in an epoxy binder.

The core 32 may broadly comprise a reinforcing truss 33 held in a carrier which may comprise a light weight, low density layer of foam 46. The foam layer 46 may comprise, without limitation, a polymethacrylimide (PMI) rigid closed cell foam known by the trade name ROHACELL®. ROHACELL® is commercially available in differing densities and thicknesses, and has a relatively low coefficient of linear thermal expansion. The foam layer 46 functions to hold the truss 33 in place during fabrication of the core 32 and also may add some degree of structural strength to the core 32.

Figure 3:
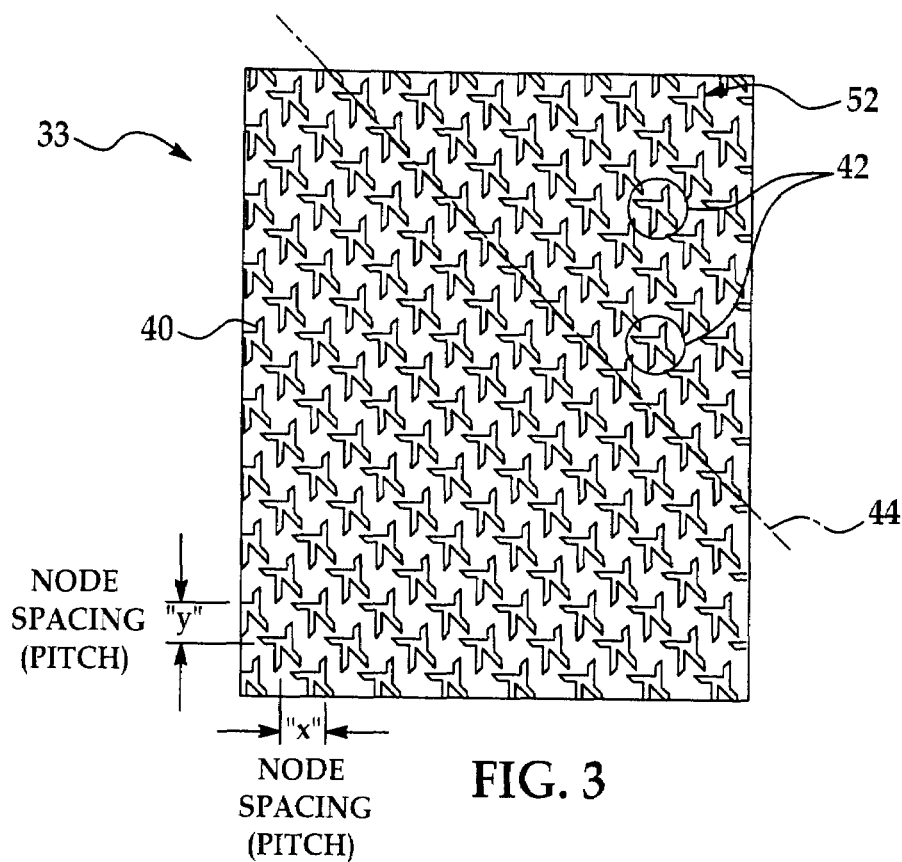
FIG. 3 is a plan illustration of the truss viewed in the direction 3-3 shown in FIG. 2.

The reinforcing truss 33 may comprise an array of structural pins 40 which are arranged in groups 42 that may be regularly spaced from each other, as best seen in FIG. 3, using pre-selected pitches "x" and "y". In one embodiment, the "x" and "y" pitches are equal, resulting in a square pitch that aligns the groups 42 along diagonal axes 44.

As best seen in FIGS. 5-8, the pins 40 are symmetrically arranged around a central axis 50 in each group 42, and are substantially circumferentially spaced equally from each other. Each of the pins 40 includes medial portions 40a that are inclined relative to the planes of the facesheets 34, 36, and distal portions 40b, 40c which extend substantially parallel to the facesheets 34, 36. The medial portions 40a of the pins 40 are inclined from vertical at an angle φ (FIG. 4) which, in one embodiment may be approximately 30 degrees; other angles are possible. The pins 40 in each group 42 are arranged such that the medial portions 40a intersect each other and are nested around a node 52 that is aligned with the central axis 50. Although four pins 40 may be employed, another embodiment 42a shown in FIG. 9 employs three pins 4C circumferentially spaced equally around node 52.

Figure 4:
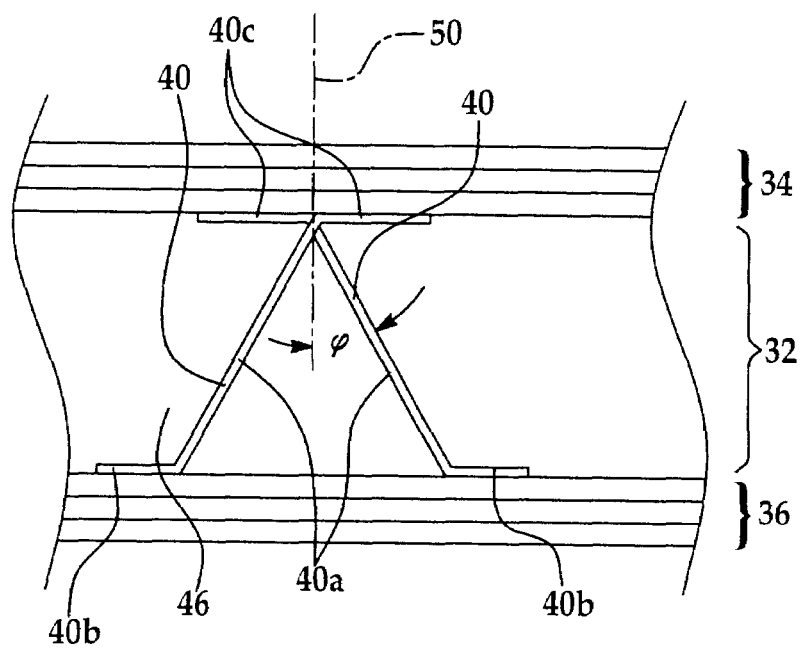
FIG. 4 is an enlarged, cross sectional illustration of the composite sandwich shown in FIG. 1.
Figure 5:
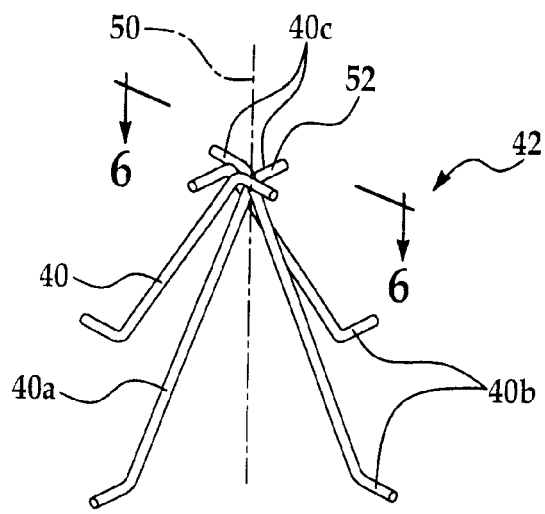
FIG. 5 is an isometric illustration of one group of pins used in the core illustrated in FIG. 2.
Figure 6:
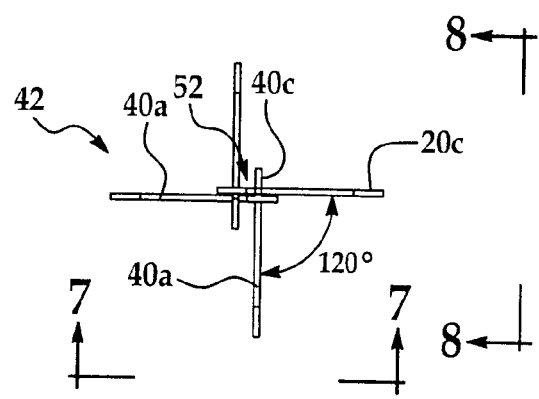
FIG. 6 is a view in the direction 6-6 shown in FIG. 5.
Figure 7:
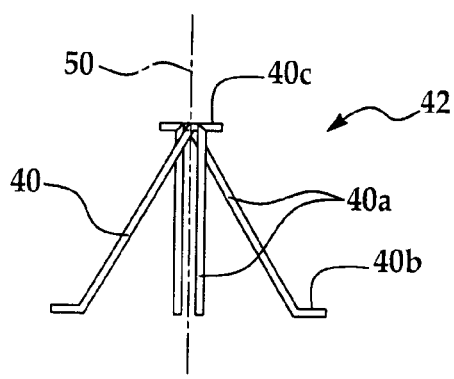
FIG. 7 is a view in the direction 7-7 shown in FIG. 6.
Figure 8:
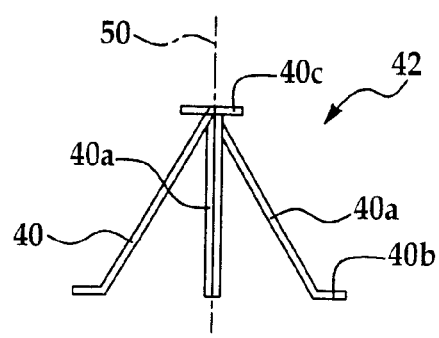
FIG. 8 is a view in the direction 8-8 shown in FIG. 6.

As best seen in FIG. 4, in one embodiment, the distal portions 40b, 40c extend parallel and are bonded to the inside face of the facesheets 34, 36 respectively. As shown in FIG. 10, the length "L" of the distal portion 40b, 40c will depend upon the particular application, however in one embodiment the length "L" may be approximately 4 to 6 times the diameter of the pin 40. As will be discussed later in more detail, the length "L" may be determined by the process used to fabricate the core 32

In one embodiment, the pins 40 may be formed of poltruded graphite held in an epoxy binder. When the facesheets 34, 36 are bonded to the core 32, the epoxy binder in the distal ends 40b, 40c of the pins 40 fuse with epoxy binder 48 that migrates from an adjacent facesheet ply 34a (FIG. 10), so that the ends of the pins 40 become bonded to and form a part of the facesheets 34, 36. Alternatively, the distal ends 40b, 40c (see for example, 40c in FIG. 11) may be bonded between adjacent plies 34a, 34b of the facesheets 34, 36, thereby locking the ends of the pins 40 within the facesheets 34, 36. A dry film adhesive is placed between core 32 and facesheets 34 and 36 to improve bonding of distal ends 40b, 40c with the facesheets 34, 36. The epoxy binders in pins 40, the dry film adhesive and the facesheets 34, 36 should be chosen for their compatibility so that they fuse during the cure process at the same cure temperature. The amount and type of the dry film may significantly affect the strength of the finished structure.

As will be discussed below, the selection of the values for certain parameters characterizing the core 32 including the truss 33, provide a particularly durable and reliable sandwich construction 30 that may be readily scaled to meet the requirements of various applications. The parameters of particular interest in constructing the sandwich structure 30 include: the type of carrier foam 46, the diameter of the pins 40, the orientation angle φ of the pins 40 (from vertical), the spacing of the pins from each other, the reveal height ("L") of the pins 40, the number of pins in each pin group 42, and the particular type of material used to fabricate the pins, 40.

FIG. 12 illustrates the superior structural properties of two embodiments relative to a sandwich construction employing a un-reinforced core. Curves 60 and 64 represent the shear strength as a function of temperature for a sandwich construction 30 employing a reinforced core according to the disclosed embodiments using foam densities of 12 and 6.9 pounds per cubic foot, respectively. In contrast, the curves represented by 62 and 66 show the shear strength for a ½ inch core using un-reinforced ROHACELL foam of 12 and 6.9 pounds per cubic foot, respectively. As is apparent from the test results shown in FIG. 12, embodiments of the disclosure employing the reinforced core 32 exhibit superior shear strength compared to unreinforced cores of the same density.

Figures 15, 16:
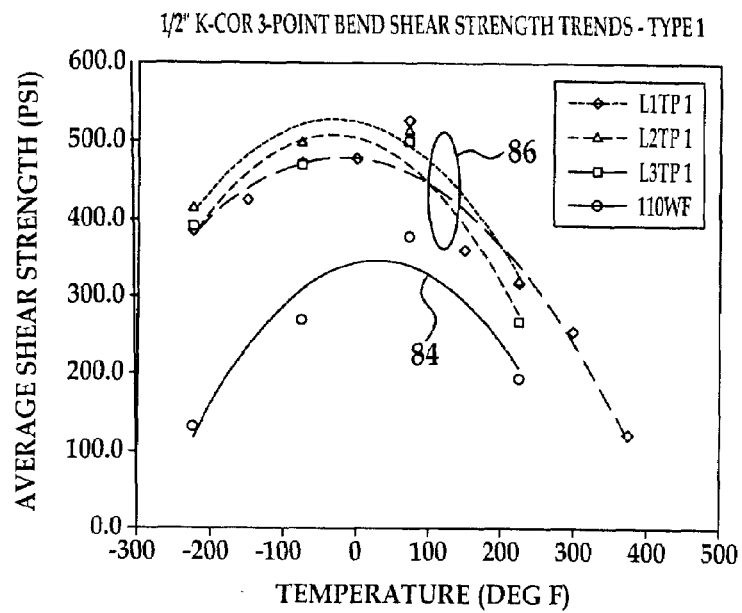
FIG. 15 is a table showing values for key parameters characterizing the disclosed embodiments.
FIGS. 16-23 are graphs showing the results of tests performed on various embodiments of the sandwich construction, compared to sandwich constructions employing a unreinforced foam core.

Referring to FIGS. 13 and 14, a series of tests were performed that were used to identify the parameters of the sandwich structure 30 that could be used to provide substantially improved structural properties for the sandwich structure 30 while assuring adequate bond strength and avoiding core cracking or other deterioration of the core 32. A key for interpreting the test result curves in FIG. 13 is shown in FIG. 14. For example, a sandwich construction was fabricated using values for various parameters that provided test results represented by curve "A" in FIG. 13. The particular embodiment represented by curve "A" included a core 32 having a density of 12.08 pounds per cubic foot, ½" thick, pins 40 having a diameter of 0.020 inches inclined at 35 degrees relative to vertical, a reveal height ("L") of 0.080 inches and a pin density of 8.8. Using the test results shown in FIG. 13, values for a group of parameters have been developed for various applications, as shown in FIG. 15. These parameters include core density 68, core thickness 70, pin diameter 72, pin angle from vertical 74, pin spacing (pitch), pin reveal length 78, number of pins per node and the type of foam carrier 82. The desired foam density ranges between 6.9 and 12 pounds per cubic foot. The core thickness ranges from ½ to 1 inch, while pin diameter is between 0.02 and 0.028 inches. The preferred pin angle is approximately 30 degrees and the square pitch spacing between nodes 52 ranges from 0.168 to 0.191 inches. The reveal height ("L") is approximately 0.055 inches. Four pins per node were employed and the carrier foam is a PMI such as a type 51WF ROHACELL.

Using the values for the parameters shown in FIG. 15, a series of tests on sandwich samples were performed; the results of these are shown in FIGS. 16-23. FIG. 16 shows the results of tests performed on various sandwich constructions 30 having a ½" core 32 using a three point bend shear strength test in accordance with ASTM C-393. ASTM C-393 is a standardized test method used to determine the core shear properties of flat sandwich constructions subjected to flexure in a manner such that the applied moments produce curvature of the sandwich facing planes. Graphs 86 represent the test results for three embodiments of the truss reinforced core 32 having a density of 6.9 pounds per cubic foot, while graph 84 represents the test results using an unreinforced core comprising ROHACELL foam. The test results are provided in terms of the average shear strength in pounds per square inch as a function of temperature.

Figure 17:
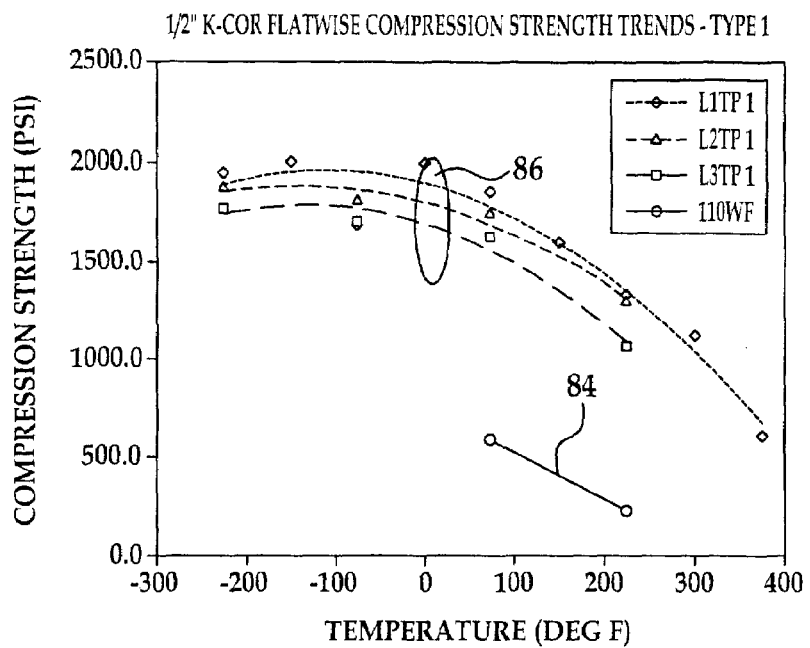
Figure 18:
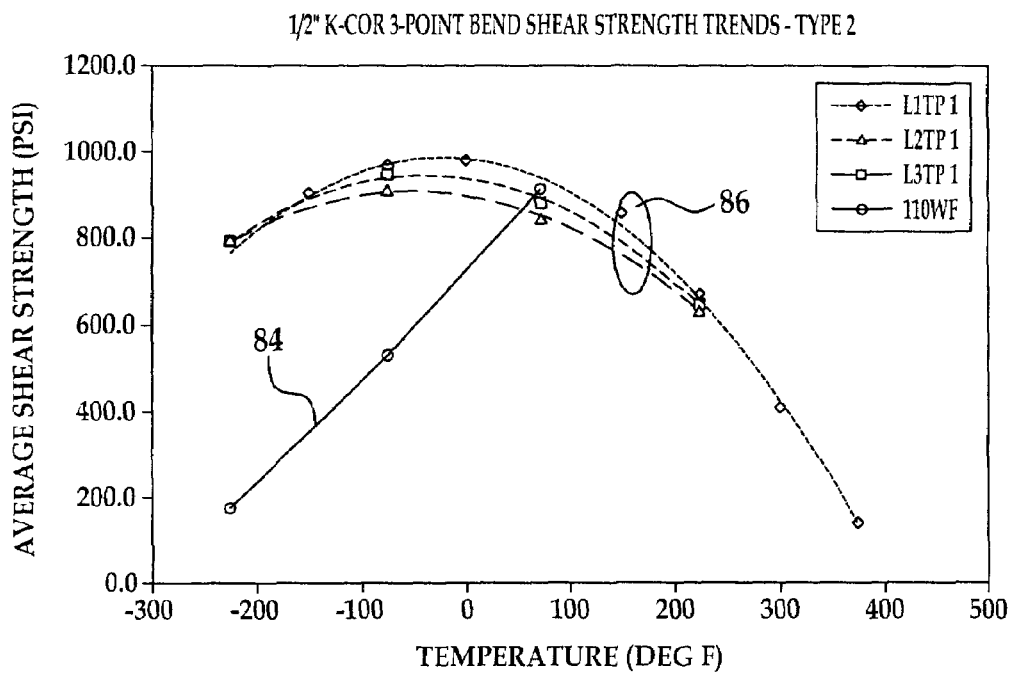
Figure 19:
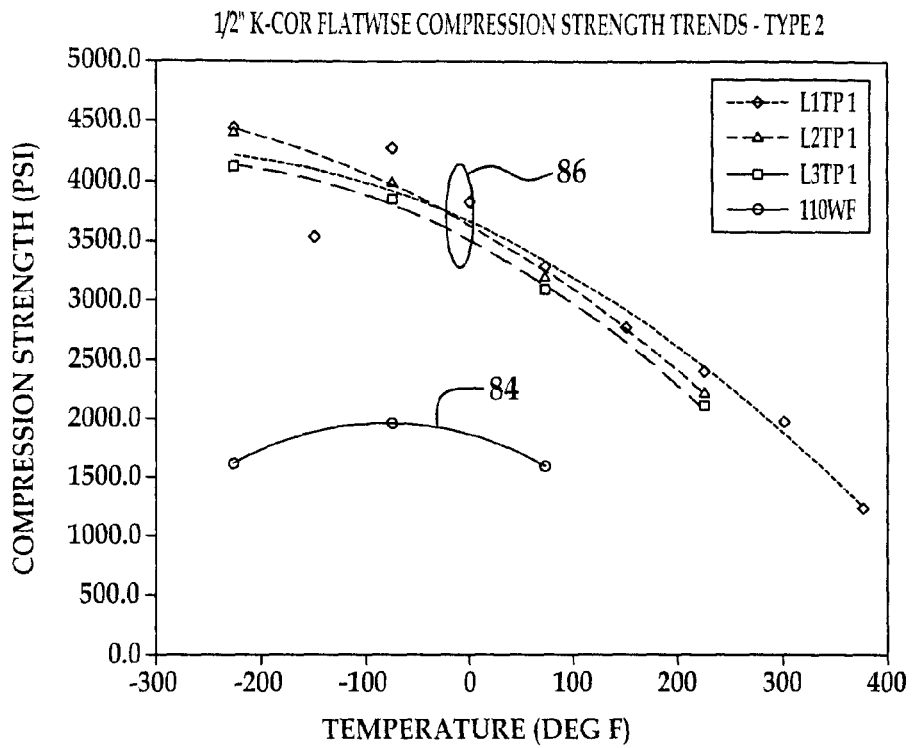

The samples represented by the test results shown in FIG. 16 were also subjected to flat-wise compression strength testing in accordance with ASTM C365, resulting in the test results shown in FIG. 17. The test results in FIG. 17 are provided in terms of compression strength in pounds per square inch as a function of temperature. FIGS. 18 and 19 show test results similar to FIGS. 16 and 17, but for test samples employing densities of 12 pounds per cubic foot.

Figure 20:
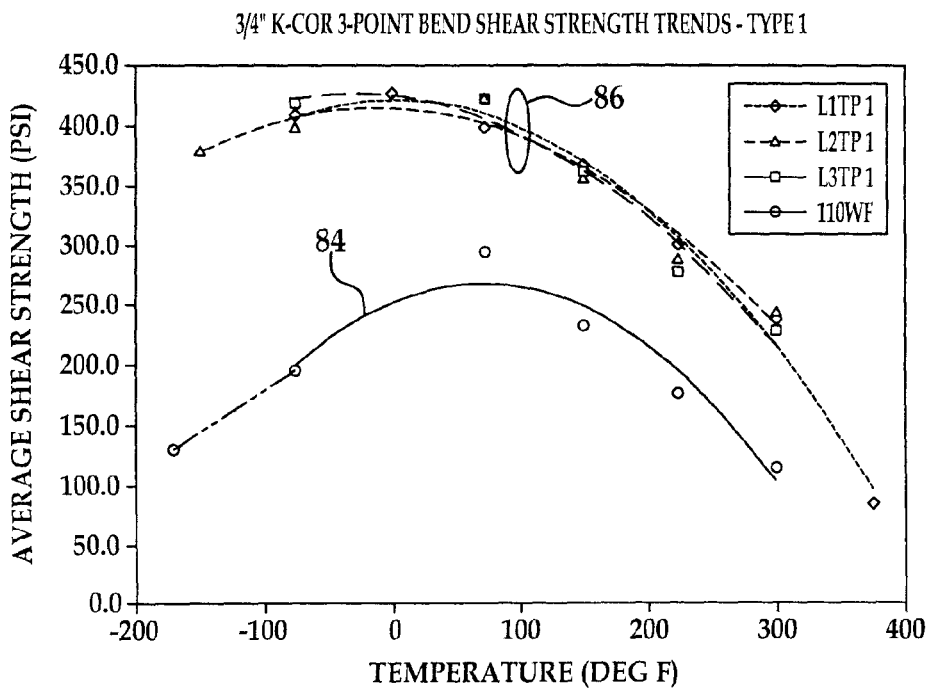
Figure 21:
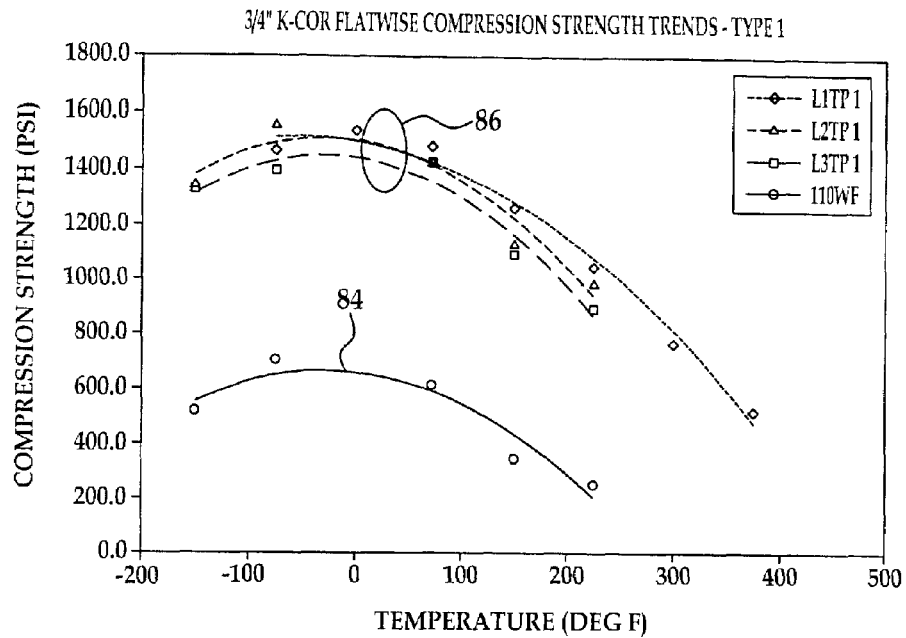
Figure 22:
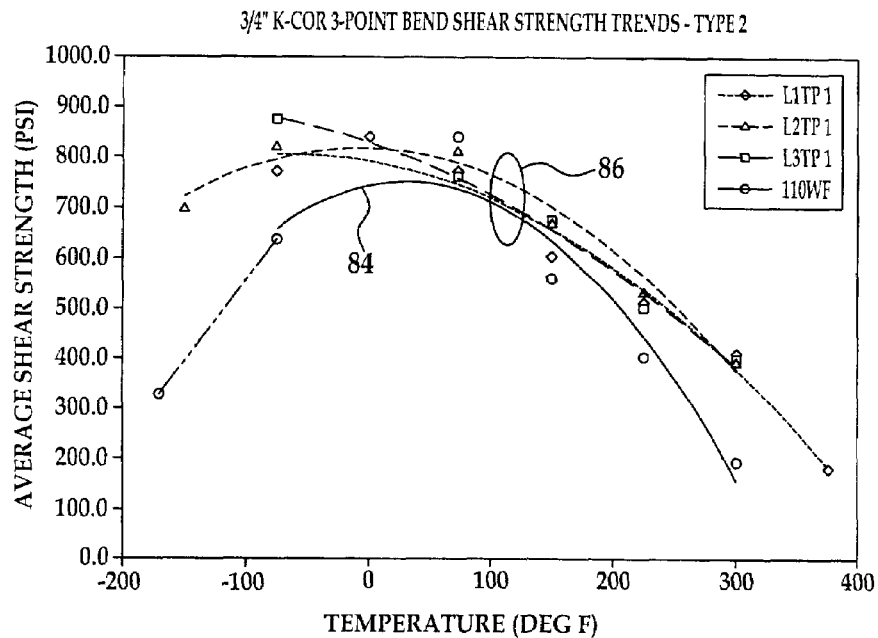
Figure 23:
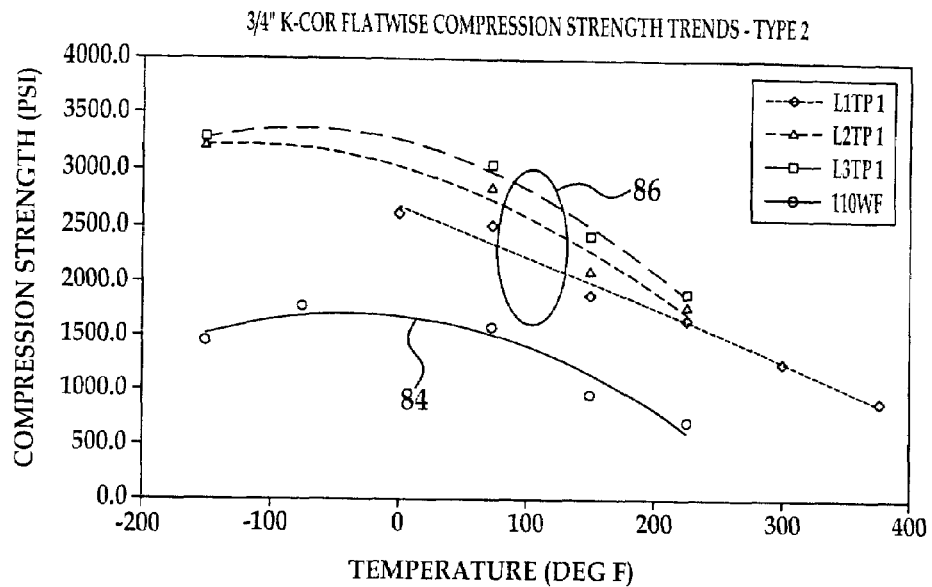

FIGS. 20 and 21 provide comparative test results for samples having ¾" thick cores 32 and densities of 6.9 pounds per cubic feet. Similarly, FIGS. 22 and 23 provide test results for samples having ¾" thick cores and densities of 12 pounds per cubic feet.

As is evident from the test results represented by the graphs shown in FIGS. 16-23, test samples employing values of the parameters within the ranges listed in FIG. 15 exhibit substantially superior shear and compressive strengths compared to sandwich constructions with un-reinforced cores.

Figure 24:
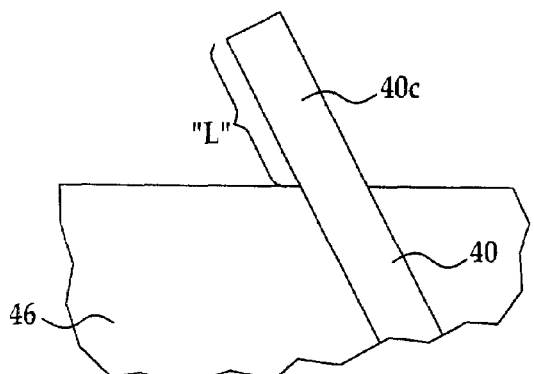
FIG. 24 is a sectional illustration showing an intermediate step in a fabrication method in which the pins are inserted into a foam core, the distal end of the pin shown protruding from the core before the pin is flayed.
Figure 25:
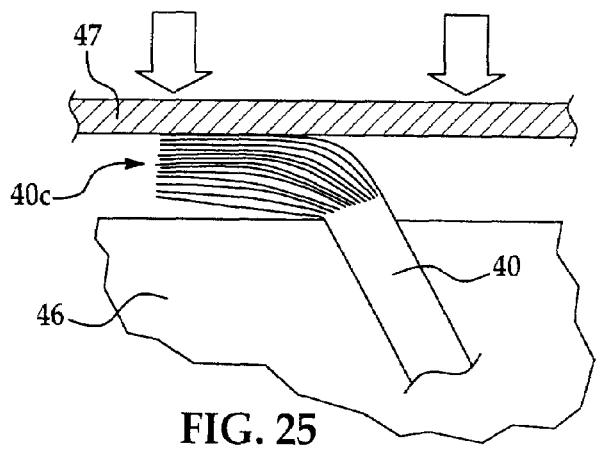
FIG. 25 shows another step in the fabrication method, in which a heated platen bends and flays the distal ends of the pin.
Figure 26:
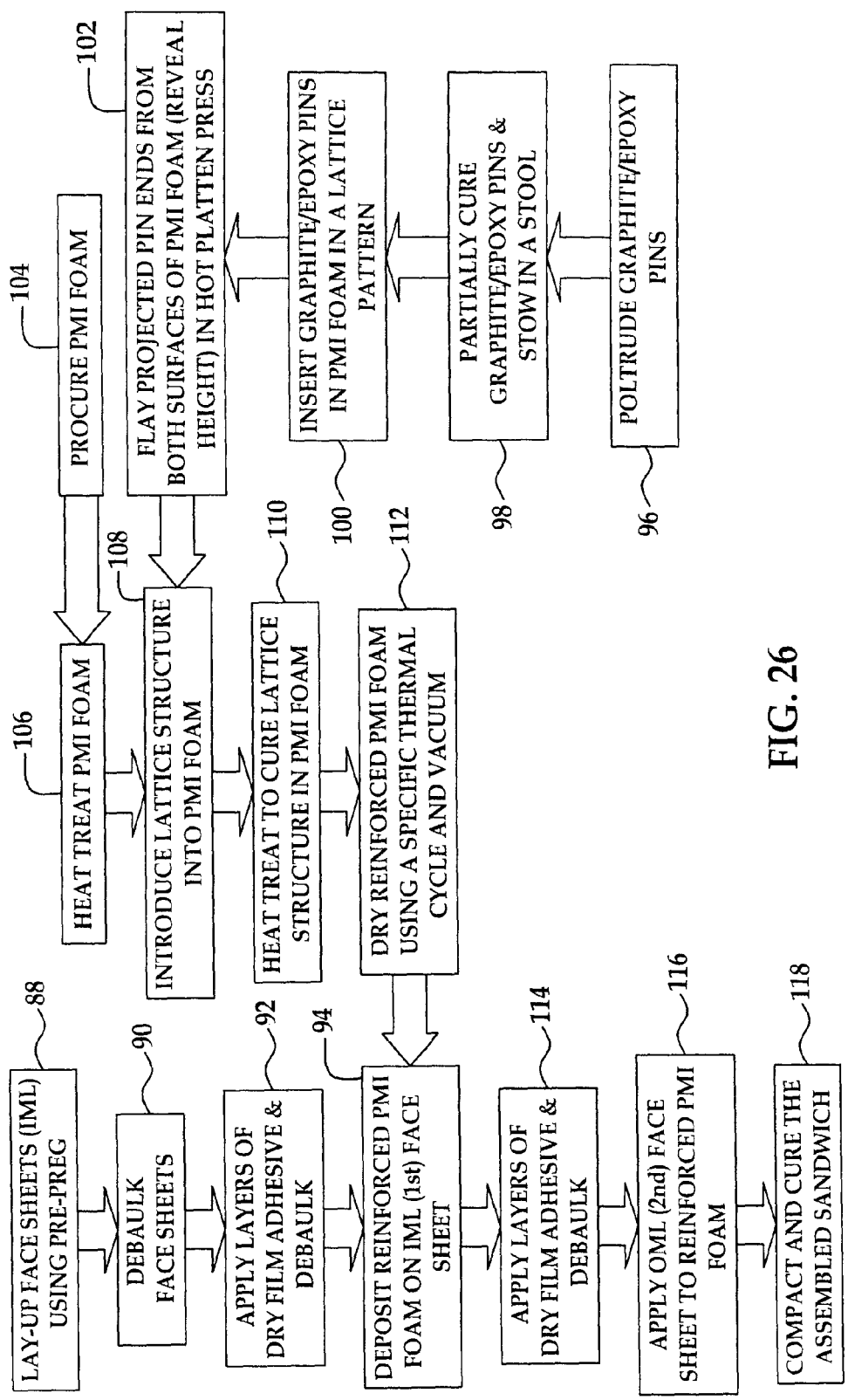
FIG. 26 is a flow diagram illustrating a method for fabricating the composite sandwich.

Referring now concurrently to FIGS. 24-26, a method of fabricating a composite sandwich 30 begins at step 88 with laying up facesheets 34, 36 using prepreg which may comprise graphite fabric or other forms of graphite fiber impregnated with a polymer resin such as epoxy. In other embodiments, the facesheets 34, 36 may be fabricated by infusing resin into a preform of dry fabric or tacked fabric. Next, at step 90, the facesheets 34, 36 are debaulked. Then, at step 92, a dry film adhesive is applied to the facesheets 34, 36 and the lay-up is again debaulked.

Separately, the core 32 is prepared, by following steps 96-112. Beginning at step 96, the pin material is developed by poltruding graphite/epoxy, which comprises pulling fine carbon fibers through a die and resin bath. The pin material is partially cured and taken up on a spool at step 98. At step 100, the graphite/epoxy pins 40 are inserted into a layer of PMI foam 46 in a three dimensional lattice pattern. The pin insertion process may be performed using commercial equipment (not shown) that includes, without limitation, an automated tool head operated by a programmed computer. The insertion head inserts the pin material from any desired angle from vertical, and following the insertion, a fixed Length is automatically cut and the insertion depth is adjusted so that a desired reveal height "L" is exposed at the top and bottom surfaces of the foam layer 46. The pins 40 are inserted along trajectories that are indexed around the central axis 50. FIG. 24 shows one of the pins 40 having just been inserted into the foam layer 46, with the distal portion 40c extending above the upper surface of the foam layer 46 corresponding to a reveal height "L".

Next, at step 102, the distal portions 40b, 40c are flayed and bent in a process shown in FIG. 25, wherein a hot press platen 47 moves downwardly into contact with the distal portions 40c, bending the fibers and partially melting the epoxy binder, so as to cause the fibers to separate and splay open, parallel to the outer surfaces of the foam layer 46. Since the pins 40 comprise multiple fine fibers and poltruded resin, when pressure is applied to the distal portions of the pins 40 by the hot platen press, the fibers in the distal portions open like a fan instead of bending as a unit. Step 108 represents completion of the formation of the truss 33 within the foam layer 46.

The foam layer 46 may be either procured as shown at step 104 as a purchased component or fabricated, following which the foam layer 46 is heat treated at step 106. Heat treatment of the foam layer 46 may be optionally required in some cases where the foam may have a tendency to absorb atmospheric moisture. Heat treating of the foam layer 46 both removes the moisture and may improve the mechanical strength of the foam layer 46 so that the foam layer 46 better supports the pins 40 and provides some degree of structural strength for the core 32.

With the truss 33 having been formed in the foam layer 46 at step 108, the core 32 is then heat treated at step 110 in order to cure the truss 33. The heat treatment at step 110 results in a full cure of the partially cured pins 40. The preformed core 32 is then dried at step 112. The drying at step 112 may include a primary drying step followed by a final dry and pre-layup drying cycle. The purpose of this two step drying cycle is to remove any remaining moisture in the preform core 32, as well as to assure that the truss 33 is completely cured. The primary drying step may comprise successively increasing the temperature according to a predefined schedule over time, however the exact schedule will depend upon the application. The final drying step may involve subjecting the core 32 to a constant temperature for a period of time, for example, 250° F. for a period of 8 to 24 hours, in one embodiment.

At step 94, the fully formed and cured core 32 is deposited on facesheet 34, and then layers of dry film adhesive are applied to the remaining, exposed face of the core 32. The dry film adhesive may comprise, for example, a 350 degree F. cure epoxy film adhesive commercially known as FM300 film adhesive available from Cytec. Following debaulking at step 114, the second facesheet 36 is applied to the exposed, remaining face of the core 32, as shown in step 116. Finally, the sandwich structure 30 is compacted and cured at step 118.

Figure 27:
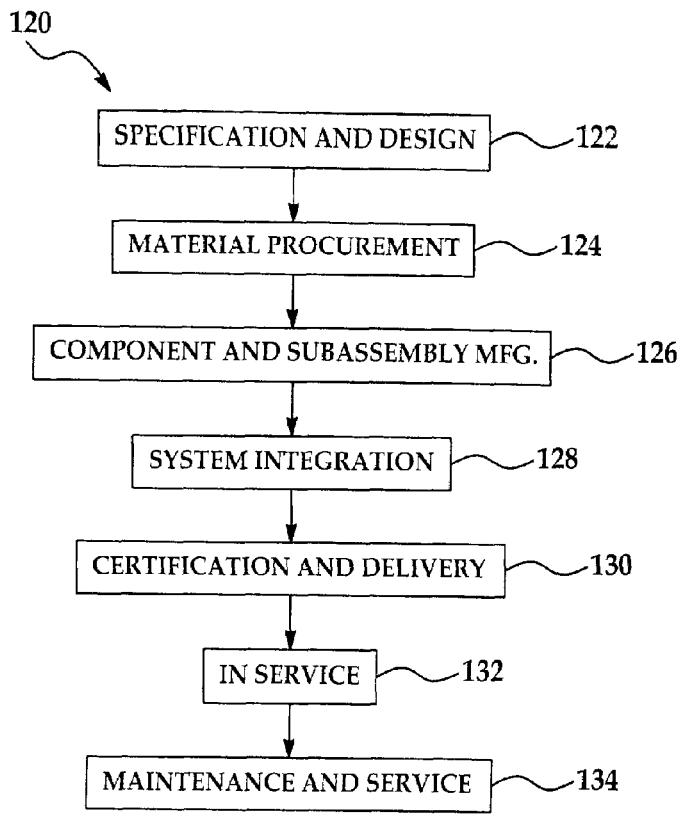
FIG. 27 is a flow diagram of aircraft production and service methodology.
Figure 28:
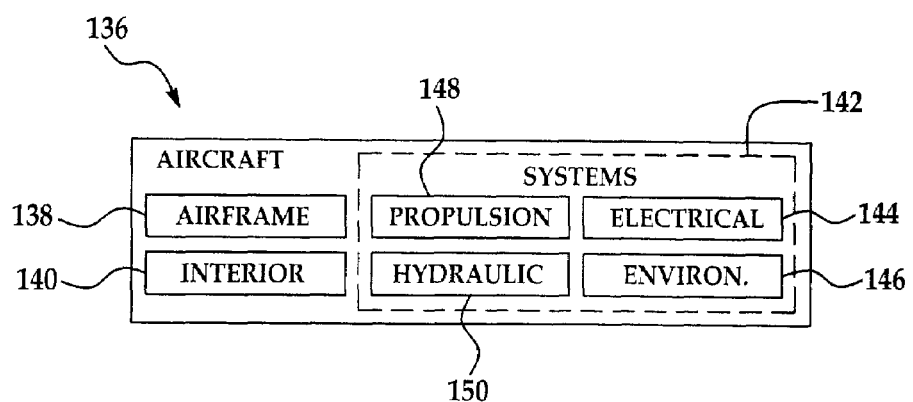
FIG. 28 is a block diagram of an aircraft.

Embodiments of the disclosure may find use in a variety of potential applications, particularly in the transportation industry, including for example, aerospace and automotive applications. Thus, referring now to FIGS. 27 and 28, embodiments of the disclosure may be used in the context of an aircraft manufacturing and service method 120 as shown in FIG. 27 and an aircraft, 136 as shown in FIG. 28. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 120 may include specification and design 122 of the aircraft 136 and material procurement 124. During production, component and subassembly manufacturing 126 and system integration 128 of the aircraft 136 takes place. Thereafter, the aircraft 136 may go through certification and delivery 130 in order to be placed in service 132. While in service by a customer, the aircraft 136 is scheduled for routine maintenance and service 134 (which may also include modification, reconfiguration, refurbishment, and so on.

The preferred method of the invention is well suited for forming thermoplastic composite stiffened members in the supporting framework of an aircraft fuselage. Potential examples of thermoplastic composite stiffened members include but are not limited to fuselage skins, wing skins, control surfaces, door panels and access panels. Stiffening members include but are not limited to keel beams, floor beams, and deck beams. For illustrative purposes only, the invention will initially be described in reference to forming a thermoplastic composite floor beam 20 for use in a commercial aircraft fuselage. However, while an I-section is shown, other stiffened member geometries such as Z-section, U-section, T-section, etc. will also be later described, including those having curvature along their length.

Each of the processes of method 120 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 28, the aircraft 136 produced by exemplary method 120 may include an airframe 138 with a plurality of systems 142 and an interior 140. Examples of high-level systems 142 include one or more of a propulsion system 148, an electrical system 144, a hydraulic system 150, and an environmental system 146. Any number of other systems may be included. Although an aerospace example is shown, the principles of the invention may be applied to other industries, such as the automotive industry.

The apparatus embodied herein may be employed during any one or more of the stages of the production and service method 120. For example, components or subassemblies corresponding to production process 126 may be fabricated or manufactured in a manner similar to components or subassemblies produced while the aircraft 136 is in service. Also, one or more apparatus embodiments may be utilized during the production stages 126 and 128, for example, by substantially expediting assembly of or reducing the cost of an aircraft 136. Similarly, one or more apparatus embodiments may be utilized while the aircraft 136 is in service, for example and without limitation, to maintenance and service 134.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite sandwich, comprising:
   first and second fiber reinforced polymer facesheets, each facesheet comprising a respective inner surface; and
   a reinforced core between the first and second facesheets and connected directly to the first and second facesheets at the respective inner surface;
   a plurality of pins arranged in groups forming a truss, each of the pins including medial portions extending between the first and second facesheets and distal portions respectively extending generally parallel with and bonded to the first and second facesheets, the pins in each group intersecting at a node adjacent one of the first and second facesheets, the distal portions of the pins not penetrating the first face sheet and the second face sheet, and the distal portions of the pins bonded to the inner surfaces of each of the first facesheet and the second facesheet, the inner surfaces directed to the core, the truss positioned in the core; and
   a carrier surrounding the pins.

2. The composite sandwich of claim 1, wherein:
   each of the pins includes carbon fiber reinforced resin, the distal portion of at least a set of the pins being flayed, and
   each of the first and second facesheets includes laminated plies of carbon fiber reinforced resin.

3. The composite sandwich of claim 2, wherein the distal portions of the pins in each of the groups radiate outwardly from the node formed by the pins in the set, and wherein the distal portion of the set of pins is flayed so as to cause fibers of the distal portion to splay open.

4. The composite sandwich of claim 1, wherein the nodes are spaced substantially equidistant from each other.

5. The composite sandwich of claim 1, wherein each of the groups include at least 3 of the pins.

6. The composite sandwich of claim 1, wherein the pins in each of the groups are inclined relative to the planes of the facesheets approximately 30 degrees.

7. The composite sandwich of claim 1, wherein the carrier includes rigid foam.

8. The composite sandwich of claim 7, wherein the rigid foam includes a polymethacrylimide.

9. The composite sandwich of claim 1, wherein the pins in each of the groups are radially spaced substantially equidistant from each other around the node formed by the set.

10. The composite sandwich of claim 1, wherein the carrier is closed cell foam, and the core has a density of between approximately 6.9 and 12 pounds per cubic foot.

11. The composite sandwich of claim 10, wherein the core has a thickness of between approximately ½ inch and 1 inch.

12. The composite sandwich of claim 1, wherein the nodes are spaced from each other between approximately 0.168 and 0.191 inches.

13. The composite sandwich of claim 1, wherein the core has a coefficient of thermal expansion generally matching the coefficient of thermal expansion of the first, and second facesheets.

14. An aircraft comprising:
    a fuselage; and
    an aircraft structure connected to the fuselage, the aircraft structure comprising a composite sandwich, comprising:
    first and second fiber reinforced polymer facesheets, each facesheet comprising a respective inner surface; and
    a reinforced core between the first and second facesheets and connected directly to the first and second facesheets at the respective inner surface;
    a plurality of pins arranged in groups forming a truss, each of the pins including medial portions extending between the first and second facesheets and distal portions respectively extending generally parallel with and bonded to the first and second facesheets, the pins in each group intersecting at a node adjacent one of the first and second facesheets, the distal portions of the pins not penetrating the first face sheet and the second face sheet, and the distal portions of the pins bonded to the inner surfaces of each of the first facesheet and the second facesheet, the inner surfaces directed to the core, the truss positioned in the core; and a carrier surrounding the pins.

15. A reinforced polymer composite structure, comprising:

a pair of fiber reinforced polymer facesheets, each facesheet comprising a respective inner surface;

a reinforced core between the facesheets and connected directly to the first and second facesheets at the respective inner surface; and a plurality of structural pins positioned in the reinforced core, the plurality of structural pins arranged in groups thereof, the pins in each of the groups substantially intersecting with each other and being spaced around a central axis extending generally normal to the facesheets, a distal portion of the pins bonded to the inner surfaces of each of the face sheets, each of the inner surfaces configured to face the core, wherein the pins do not penetrate either of the facesheets, and wherein a distal portion of the pins is flayed open such that fibers of the pins are splayed open and bonded to the inner surface of each of the face sheets.

16. The composite structure of claim 15, wherein the pins in each of the groups are symmetrically arranged around the central axis.

17. The composite structure of claim 15, wherein each of the pins includes distal portions extending substantially parallel with the facesheets, and at least a set of the pins comprise a distal portion that is flayed open.

18. The composite structure of claim 15, wherein each group of the pins includes at least 3 of the pins.

19. The composite structure of claim 15, wherein the pins and the facesheets are formed of graphite fibers held in an epoxy binder.

20. The composite structure of claim 15, wherein the core has a coefficient of thermal expansion generally matching the coefficient of thermal expansion of each of the facesheets.

21. The composite structure of claim 15, wherein each of the pins is inclined relative to the planes of the facesheets at an angle of approximately 30 degrees.

22. The composite structure of claim 15, wherein:

each of the pins includes medial portions extending generally transverse to the facesheets, and distal portions extending generally parallel to the facesheets, and wherein the pins in each of the groups intersect each other at a junction generally between the medial and distal portions of the pins.

23. The composite structure of claim 15, wherein the pins in each of the groups includes distal portions symmetrically arranged around and radiating from the central axis.

24. The composite structure of claim 15, wherein the core has a density generally between 6.9 and 12 pounds per cubic foot.

25. The composite structure of claim 24, wherein the thickness of the core is generally between ½ and 1 inch.

26. The composite structure of claim 24, wherein each of the pins includes graphite fiber reinforced epoxy and has a diameter between approximately 0.020 and 0.028 inches.

27. The composite structure of claim 24, wherein the central axes of adjacent groups of the pins are spaced from each other between approximately 0.169 and 0.191 inches.

28. The composite structure of claim 24, wherein the core includes a polymethacrylimide foam surrounding the pins.

29. An aircraft subassembly incorporating the composite structure of claim 15.

* * * * *